United States Patent Office 3,341,634
Patented Sept. 12, 1967

3,341,634
PROCESS FOR THE PRODUCTION OF O,O-DIALKYL THIO-PHOSPHORYL ACETIC AND PROPIONIC ACID MONO SUBSTITUTED AMIDES
Günter Oertel, Cologne-Flittard, Hugo Malz, Leverkusen, and August Dörken, Wuppertal-Sonnborn, Germany, assignors to Farbenfabriken Bayer Aktiengesellschaft, Leverkusen, Germany, a German corporation
No Drawing. Filed June 4, 1963, Ser. No. 285,207
Claims priority, application Germany, June 6, 1962, F 37,004
4 Claims. (Cl. 260—984)

The present invention relates to and has as its object a new and useful process for the production of α-[O,O-dialkyl-mono- or -dithiophosphoryl]-carbonic acid amides.

α-[O,O-dialkyl-mono- or -dithiophosphoryl]-carbonic acid amides are known as very effective pest control agents.

Therefore various methods have already been proposed for the production of the mentioned compounds. Thus, according to the process of U.S. patent specification No. 2,494,283, salts e.g. alkali metal or ammonium salts of O,O-dialkyl-dithiophosphoric acids are reacted with N-alkyl-chloroacetoamides whereupon the desired compounds are formed with the splitting off e.g. alkali metal or ammonium chloride. The alkylation reactions, however, simultaneously occurring under the reaction conditions of this process result in substantial amounts of undesirable by-products and thus relatively low yields of the desired compounds are obtained [cf. G. Berkelhammer et al., J. Org. Chem., vol. 26, 2281 (1961)].

Some other processes were disclosed later which enable the production of α-[O,O-dialkyl-mono- or -dithiophosphoryl]-carbonic acid amides, especially O,O-dimethyl-thionothiolphosphoryl-acetic acid-N-monomethyl amide (I) under milder reaction conditions.

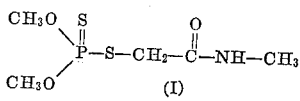

These processes are the object of the French patent specification No. 1,234,879, German patent specification No. 1,076,662 and a method described by G. Berkelhammer et al (s. above).

According to French patent specification No. 1,234,879, O,O-dimethyl-thionothiolphosphoryl-acetic acid (II) is reacted with benzoyl chloride to give the mixed anhydride (III) which is subsequently split with methylamine to yield the desired compound (I) and the methylammonium salt of benzoic acid.

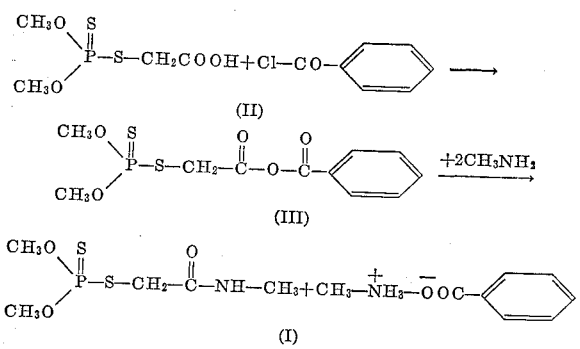

The process of the German patent specification No. 1,076,662 starts from the O,O-dimethyl-thionothiolphosphoryl-acetic acid phenyl ester (IV), splitting the latter by the action of methyl-amine to the desired compound (I) and phenol.

The third of the above mentioned processes likewise starts from O,O-dimethyl-thionothiolphosphoryl-acetic acid (II). The latter is reacted with phosphorous acid ethylene ester chloride and triethylamine to give the intermediate product (V) which, when split with methylamine, yields compound (I) and, in addition, phosphorous acid ethylene ester.

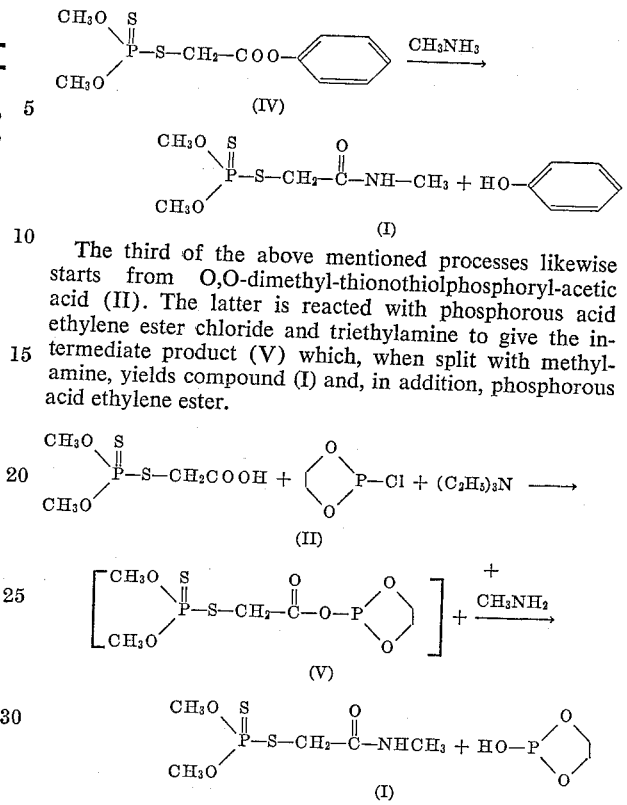

In each of the three last-mentioned known processes stoichiometric quantities of barely volatile by-products occur besides the desired α-[O,O-dialkylmono- or -dithiophosphoryl]-carbonic acid amides. They are the methylammonium salt of benzoic acid in the first, phenol in the second, and phosphorous acid ethylene ester in the third case. In order to isolate the main product, these by-products must be separated by washing them out with solvents. In many cases, especially if the desired α-[O,O-dialkyl-mono- or -dithiophosphoryl]-carbonic acid amide is water-soluble or sensitive to alkalies, this encounters great difficulties and involves nearly always loss in yield. Moreover, it is often not possible to obtain in this way the desired amides completely pure, especially free of salts.

The object of the present invention is to provide a new process for the production of α-[O,O-dialkylmono- or -dithiophosphoryl]-carbonic acid amides which obviates the aforesaid disadvantages and enables, moreover, the yields to be substantially improved, as compared with the known processes.

According to the process of the invention, α-[O,O-dialkyl-mono- or -dithiophosphoryl]-carbonic acids are reacted with organic isocyanates whereby the desired α-[O,O-dialkyl-mono- or -dithiophosphoryl]-carbonic acid amides are formed in practically quantitive yields with the splitting off of carbon dioxide.

All α-[O,O-dialkyl-mono- or -dithiophosphoryl]-carbonic acids are suitable as starting materials, e.g. O,O-dimethyl-thiol- or -thionothiolphosphoryl-acetic acids, or α-[O,O-diethyl-thiol- or -thionothiolphosphoryl]-propionic acids.

For the inventive reaction with these acids, organic isocyanates may be generally used, such as, for example, methyl isocyanate, ethyl isocyanate, isopropyl isocyanate, butyl isocyanate, β-chloroethyl isocyanate, β-cyanoethyl isocyanate, 2,3-dichloropropyl isocyanate, trichloromethyl isocyanate, cyclohexyl isocyanate, benzyl isocyanate, tetrahydrobenzyl isocyanate, dodecyl isocyanate, dichlorohexahydrobenzyl isocyanate and the like, and also acyl isocyanates such as p-tolyl-sulphonyl isocyanate or O,O-diethylphosphoryl isocyanate for example.

The reaction on which the invention is based can be illustrated by the following scheme, starting, for example, from O,O-dimethyl-thionothiolphosphoryl-acetic acid and methyl isocyanate:

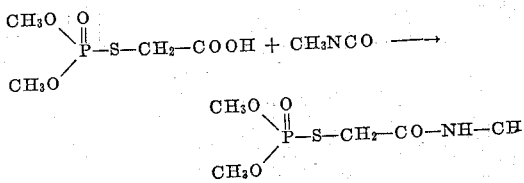

On mixing the two components, the inventive reaction proceeds exothermically and leads, in practically quantitative yield with the splitting off of carbon dioxide, to the desired products of the invention. These are colourless and in such a pure state that no purification is necessary.

In practice, the best way of carrying out the process is to mix equimolecular amounts of the two starting components and to maintain the reaction temperature of the mixture within the range of 20 to 50° C. by cooling of the latter. According to a preferred method of conducting the process, the use of solvents is dispensed with in this reaction, so that, when the splitting off of carbon dioxide has stopped, the reaction products are immediately obtained in a pure form and free of solvents. However, inert solvents such as optionally chlorinated hydrocarbons, ethers or ketones, such as diethyl and dibutyl ether, acetone, methylethyl ketone, methyl-isopropyl ketone and methyl-isobutyl ketone may also be used for the reaction, if desired.

As compared with the conventional methods, the process according to the invention is distinguished by the following advantages:

(1) The products of the process according to the invention are obtained in one reaction step and in practically quantitative yield.

(2) The inventive reaction requires no solvents or diluents.

(3) The reaction according to the invention yields no barely volatile, especially no salt-like by-products.

(4) The products of the inventive process are obtained in a colourless and analytically pure form and can be used as pest control agents without further purification.

(5) According to the process of the invention a great number of N-substituted α-[O,O-dialkyl-mono- or -dithiophosphoryl]-carbonic acid amides as, for example, N-(haloalkyl)-amides which are not obtainable by conventional methods, can also be readily produced.

The following examples are given for the purpose of illustrating the invention.

*Example 1*

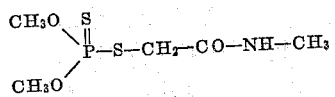

21.6 g. of O,O-dimethyl-thionothiolphosphoryl-acetic acid are mixed with 6.0 g. of methyl isocyanate. The mixture initially liquefies upon cooling, then an exothermic reaction occurs and the temperature of the mixture rises spontaneously. The temperature is maintained within the range of 30 to 40° C. by external cooling. During the splitting off of carbon dioxide now taking place, the temperature initially remains within the said range without heat supply. As soon as the temperature of the reaction mixture begins to fall the latter is heated externally to 30 to 50° C., until the evolution of carbon dioxide is completed. The remaining O,O-dimethyl-thionothiolphosphoryl-acetic acid-N-monomethyl amide is a colourless oil which immediately solidifies in the form of crystals upon trituration and then melts at 48 to 49° C. The yield amounts to 23 g. (appr. 100% of the theoretical).

*Example 2*

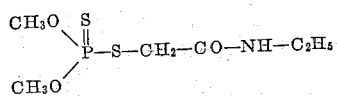

21.6 g. of O,O-dimethyl-thionothiolphosphoryl-acetic acid are reacted with 7.3 g. of ethyl isocyanate in the same way as described in Example 1. The O,O-dimethyl-thionothiolphosphoryl-acetic acid-N-monoethyl amide remains in the form of a colorless oil which solidifies crystalline upon trituration. M.P. 65 to 66° C. The yield amounts to 24 g. (appr. 100% of the theoretical).

*Example 3*

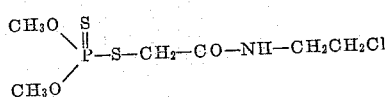

21.6 g. of O,O-dimethyl-thionothiolphosphoryl-acetic acid are reacted with 10.6 g. of β-chloroethyl isocyanate according to the instructions given in Example 1. The O,O - dimethyl-thionothiolphosphoryl-acetic acid-N-mono (β-chloroethyl)amide is a colourless oil which solidifies in a crystalline form upon trituration. The crystals melt at 66 to 67° C. Yield: 28 g. (appr. 100% of the theoretical).

*Example 4*

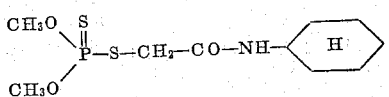

From 21.6 g. of O,O-dimethyl-thionothiolphosphoryl-acetic acid and 12.5 g. of cyclohexyl isocyanate there are obtained by the same method as given in Example 1, 30 g. (appr. 100% of the theoretical yield) of the O,O-dimethyl-thionothiolphosphoryl-acetic acid-N-monocyclohexylamide in the form of a colourless oil which crystallises upon cooling and then melts at 98 to 99° C.

*Example 5*

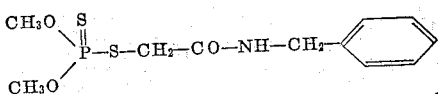

In the same way as described in Example 1 there are obtained from 21.6 g. of O,O-dimethyl-thionothiolphosphoryl-acetic acid and 13.3 g. of benzyl isocyanate 30.5 g. of O,O-dimethylthionothiolphosphoryl-acetic acid-N-monobenzyl amide in the form of a colourless oil.

*Example 6*

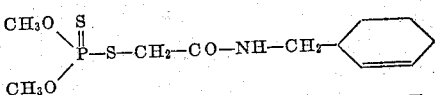

By exactly the same method as described in Example 1 there are produced from 21.6 g. of O,O-dimethyl-thionothiolphosphoryl-acetic acid and 13.7 g. of tetrahydrobenzyl isocyanate 31 g. of O,O-dimethyl-thionothiolphosphoryl acetic acid-N-mono-tetrahydrobenzyl amide in the form of a colourless oil which crystallises after standing for a short time and then shows a M.P. of 55 to 57° C.

*Example 7*

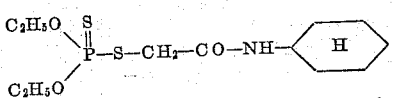

24.4 g. of O,O-diethyl-thionothiolphosphoryl-acetic acid are reacted with 12.5 g. of cyclohexyl isocyanate according to the instructions given in Example 1. As reaction product there are obtained 32.5 g. of O,O-diethylthionothiolphosphoryl-acetic acid-N-monocyclohexyl amide in the form of a colourless oil which crystallises after standing over-night. The M.P. of the product amounts to 81° C.

Example 8

$$\begin{array}{c} CH_3O \\ CH_3O \end{array} \!\!\!\!\!\! \begin{array}{c} S \\ \| \\ P\!-\!S\!-\!CH_2\!-\!CO\!-\!NH\!-\!CH \end{array} \!\!\!\!\!\! \begin{array}{c} CH_3 \\ CH_3 \end{array}$$

21.6 g. of O,O-dimethyl-thionothiolphosphoryl-acetic acid are reacted with 8.5 g. of isopropyl isocyanate in the same manner as described in Example 1. As reaction product 26 g. of O,O-dimethylthionothiolphosphoryl-acetic acid-N-isopropyl amide are obtained in the form of a colourless oil which crystallises immediately upon trituration. The M.P. of the product is 72 to 74° C.

Example 9

$$\begin{array}{c} CH_3O \\ CH_3O \end{array} \!\!\!\!\!\! \begin{array}{c} S \\ \| \\ P\!-\!S\!-\!CH_2\!-\!CO\!-\!NH\!-\!CH_2\!-\!\!\!\!\bigcirc\!\!\!\!\!\begin{array}{c} H \\ Cl \end{array} \\ Cl \end{array}$$

From 21.6 g. of O,O-dimethyl-thionothiolphosphoryl-acetic acid and 20.8 g. of 2,3-dichloro-hexahydrobenzyl isocyanate there are obtained, according to the instructions given in Example 1, 38 g. of the O,O-dimethylthionothiolphosphoryl-acetic acid-N-mono-(2,3-dichloro-hexahydrobenzyl)amide in the form of a pale yellow, viscous oil.

Example 10

$$\begin{array}{c} CH_3O \\ CH_3O \end{array} \!\!\!\!\!\! \begin{array}{c} S \\ \| \\ P\!-\!S\!-\!CH\!-\!CO\!-\!NH\!-\!CH_3 \\ | \\ CH_3 \end{array}$$

In the same manner as described in Example 1 there are obtained from 23 g. of α-(O,O-dimethyl-thionothiolphosphoryl)-propionic acid and 6 g. of methyl isocyanate 25 g. of the α-(O,O-dimethylthionothiolphosphoryl-)propionic acid-N-methyl amide in the form of a pale yellow oil.

Example 11

$$\begin{array}{c} CH_3O \\ CH_3O \end{array} \!\!\!\!\!\! \begin{array}{c} O \\ \| \\ P\!-\!S\!-\!CH_2\!-\!CO\!-\!NH\!-\!CH_3 \end{array}$$

20 g. of O,O-dimethyl-thiolphosphoryl-acetic acid are mixed with 6.0 g. of methyl isocyanate whereupon an exothermic reaction occurs and carbon dioxide is split off. After the reaction has subsided, the mixture is further heated at 30 to 50° C. for one hour, until the splitting off of carbon dioxide is completed. After removal of the volatile portions by heating the mixture for a short time at 30 to 40° C. under reduced pressure, the O,O,-dimethyl-thiolphosphoryl-acetic acid-N-monomethyl amide is obtained as an almost colourless clear oil. The yield amounts to 21.5 g.

Example 12

$$\begin{array}{c} CH_3O \\ CH_3O \end{array} \!\!\!\!\!\! \begin{array}{c} O \\ \| \\ P\!-\!S\!-\!CH_2\!-\!CO\!-\!NH\!-\!CH_2CH_2Cl \end{array}$$

Under reaction conditions analogous to those described in Example 11, 26.5 g. of the O,O-dimethyl-thiolphosphoryl-acetic acid-N-(β-chloroethyl)amide are obtained in the form of a pale yellow oil from 20 g. of O,O-dimethyl-thiolphosphoryl-acetic acid and 10.6 g. of β-chloroethyl isocyanate.

Example 13

$$\begin{array}{c} CH_3O \\ CH_3O \end{array} \!\!\!\!\!\! \begin{array}{c} O \\ \| \\ P\!-\!S\!-\!CH_2\!-\!CO\!-\!NH\!-\!CH_2\!-\!CH\!-\!CH_2 \\ \phantom{xxxxxxxxxxxxxxxxxxx} | \phantom{xx} | \\ \phantom{xxxxxxxxxxxxxxxxxxx} Cl \phantom{x} Cl \end{array}$$

In an analogous manner as described in Example 11, 31 g. of the O,O-dimethylthiolphosphoryl-acetic acid-N-mono(2,3-dichloropropyl)amide are obtained in the form of a pale yellow, viscous oil from 20 g. of O,O-dimethyl-thiolphosphoryl-acetic acid and 15.5 g. of 2,3-dichloropropoyl isocyanate.

Example 14

$$(CH_3O)_2 \!\!\stackrel{\scriptsize O}{\overset{\|}{P}}\!\! -\!S\!-\!CH_2\!-\!CO\!-\!NH\!-\!CH_3$$

40 g. (0.2 mol) of O,O-dimethylthiolphosphoryl acetic acid are dissolved in 70 cc. of methylene chloride. This solution is first treated with 0.5 g. of methylamine and subsequently 12 g. of methylisocyanate dissolved in 50 cc. of methylene chloride are added dropwise at 20° C. with stirring. During the adding the temperature of the mixture amounts slowly to 35° C. and carbon dioxide is evolved. Subsequently the reaction mixture is warmed for four hours to 40° C. After a short standing of the mixture at room temperature the solvent is distilled off and there are obtained 43.7 g. of a bright water-insoluble oil. For the purpose of purification the product is dissolved in 25 cc. of water, the aqueous solution is neutralised with a few drops of a saturated solution of sodium hydrogencarbonate and subsequently it is extracted 3 times with 125 cc. of methylene chloride. The united extracts in methylene chloride are dried over sodium sulphate. After distilling off the solvent at a bath temperature of max. 120° C. and a pressure of 2 mm. Hg there remain 37.7 g. (88.5% of the theoretical yield) of O,O-dimethyl-thiolphosphoryl-acetic acid-N-monomethyl amide with the refractive index $n_D^{20}$ 1.49999. The product is clearly soluble in water and the aqueous solution is reacting neutrally.

We claim:
1. A process for the production of a compound of the formula

$$\begin{array}{c} R\!-\!O \\ R_1\!-\!O \end{array} \!\!\!\!\!\! \begin{array}{c} O \\ \| \\ P\!-\!S\!-\!CH\!-\!CO\!-\!N \\ | \\ R_3 \end{array} \!\!\!\!\!\! \begin{array}{c} H \\ R_2 \end{array}$$

wherein R and $R_1$ stand for alkyl, $R_3$ stands for a member selected from the group consisting of hydrogen and methyl and $R_2$ stands for member selected from the group consisting of alkyl, haloalkyl, cyanoalkyl, cycloalkyl, benzyl, tetrahydrobenzyl, p-tolylsulfonyl, dichlorohexahydrobenzyl and O,O-diethylphosphoryl comprising reacting a compound of the formula:

$$\begin{array}{c} R\!-\!O \\ R_1\!-\!O \end{array} \!\!\!\!\!\! \begin{array}{c} O \\ \| \\ P\!-\!S\!-\!CH\!-\!COOH \\ | \\ R_3 \end{array}$$

wherein R, $R_1$ and $R_3$ are defined as above, with a compound of the formula $$R_2NCO$$

wherein $R_2$ is defined as above, at a temperature between 20 to 50° C.

2. The process according to claim 1 wherein $R_3$ stands for hydrogen and $R_2$ stands for methyl.
3. The process according to claim 1 wherein $R_3$ stands for hydrogen and $R_2$ stands for chloroalkyl.
4. The process according to claim 1 wherein R and $R_1$ stand for methyl, $R_3$ stands for hydrogen and $R_2$ stands for methyl.

References Cited

UNITED STATES PATENTS 3,187,036  6/1965  Yoshioka et al. _____ 260—984

OTHER REFERENCES

Saunders et al.: "Chemical Reviews," vol. 43 pp. 203–218 (1948).

CHARLES B. PARKER, *Primary Examiner*.

IRVING MARCUS, *Examiner*.

F. M. SIKORA, A. H. SUTTO, *Assistant Examiners*.